July 28, 1942. J. A. HEANY 2,290,877
POROUS ABRADING MATERIAL AND PROCESS OF MAKING THE SAME
Filed Sept. 24, 1938  2 Sheets-Sheet 1

INVENTOR
JOHN ALLEN HEANY
BY
Braselton Whitcomb & Davies
ATTORNEY

July 28, 1942. J. A. HEANY 2,290,877
POROUS ABRADING MATERIAL AND PROCESS OF MAKING THE SAME
Filed Sept. 24, 1938 2 Sheets-Sheet 2

INVENTOR
JOHN ALLEN HEANY
BY
Braselton Whitcomb & Davies
ATTORNEY

Patented July 28, 1942

2,290,877

UNITED STATES PATENT OFFICE 2,290,877

POROUS ABRADING MATERIAL AND PROCESS OF MAKING THE SAME

John Allen Heany, New Haven, Conn., assignor to Heany Industrial Ceramic Corporation, Rochester, N. Y., a corporation of New York Application September 24, 1938, Serial No. 231,591

9 Claims. (Cl. 51—309)

This invention relates to materials usable in abrading operations.

In my co-pending application Serial No. 225,376, filed August 17, 1938, I have described the use of aluminous material such as bauxite as an abrasive. In accordance with this application finely ground bauxite or other aluminous material is mixed with particles or balls of a volatile substance such as naphthalene, this substance being subsequently removed to impart a uniform porosity to the material which when vitrified at high temperatures produces a body having approximately uniform pores separated by walls of approximately uniform thickness.

My experimental work in connection with abrasive wheels and other articles and grains made in accordance with the process of the application above mentioned has demonstrated that a porosity or cellular volume of approximately 85% is preferably for ordinary purposes, this porosity or cellular volume resulting in walls of sufficient thickness to withstand the pressure against the material being treated, and yet not so thick as to develop glazing or to resist surface crumbling in the grinding operation. In other words, a wall thickness is desired in a homogeneous abrading substance such as bauxite which is not too thick to resist disintegration and consequently avoid glazing, and not too thin to lack the requisite resistance to compression. For some types of work, however, it has been found that grains and articles having an 85% porosity or cellular volume break down too rapidly.

It is an object of the present invention to provide an abrasive substance which employs aluminous material as a base and which is susceptible to considerable variation in the area of the abrading surface. Another object of the invention is to provide an abrading material in which the porosity may be varied at will without danger of glazing. Still another object of the invention is to provide an abrasive material which includes both a crystalline substance as well as a non-crystalline or non-recrystallized material, these two substances being usable either alone or in combination with a secondary bond. An object of the invention also is to provide novel means for increasing the rigidity of construction of an abrasive article formed either of crystalline grains fixed in a homogeneous abrasive base, or of composite grains of crystalline and normally non-crystalline material bonded together by a weak bond. Still another object is to provide an abrasive material containing crystalline abrasive grains, said grains being positioned in abrading surfaces more or less uniformly spaced one from the other.

Various other objects relating to the method of manufacture and details of the process and article will appear on consideration of the following description and of the accompanying drawings, in which.

Figure 13:
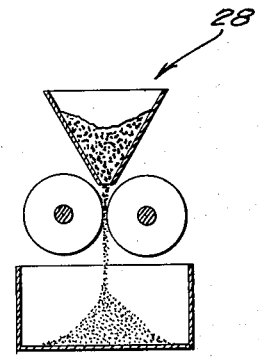
Figure 14:
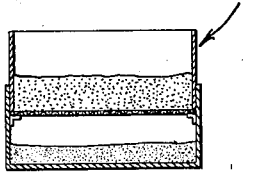

Fig. 13 indicates a fine crusher;

Fig. 14 indicates the grading step; and

Figure 15:
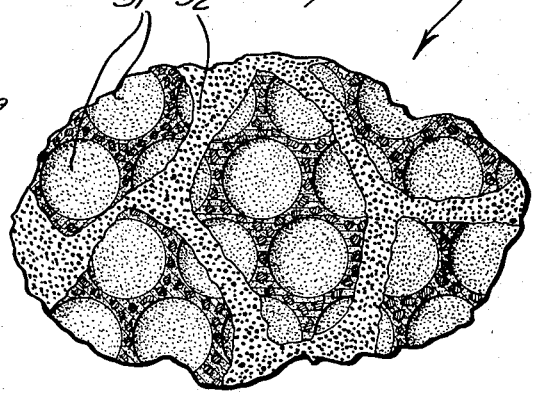

Fig. 15 is an enlarged sectional view of the final abrasive grains.

In carrying out the process of this invention I secure a mixture of crystalline grains and a vitreous, non-crystalline, amorphous abrasive such as described in my copending applications Serial No. 131,126, filed March 16, 1937, and Serial No. 135,369, filed April 7, 1937. By the term "non-crystalline" I mean substantially and for the most part without crystals formed in the mass.

As described in my co-pending application Serial No. 225,376, filed August 17, 1938, the aluminous material such as bauxite or alumina is introduced into the composition as a fine powder, preferably under twenty microns in diameter, adhering in a uniform layer to a volatile substance having an approximately spheroidal shape. While various substances may be employed such as camphor, anthracene, phthalic anhydride and naphthalene, I prefer to use naphthalene as combining a low melting point around 80° C. with the capability of being readily manufactured into spheroidal shape. While the requirement is not essential, it is desirable that the volatile substance employed be capable of sublimation so as to eliminate the possibility of disrupting the cellular spaces within the abrasive through the formation of a liquid seal.

Figure 1:
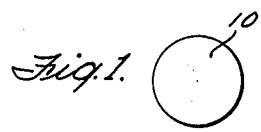
Fig. 1 is a view of a greatly enlarged mass of volatile substance used in the process for inducing porosity.
Figure 2:
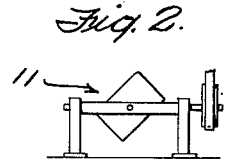
Fig. 2 is a diagrammatic showing of a mixer.
Figure 3:
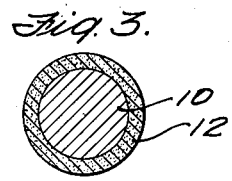
Fig. 3 is a view of the volatile substance of Fig. 1 coated with abrasive powder.

In accordance with my process, naphthalene is formed in spheroidal shape as at 10 of Fig. 1, by dropping the molten substance from a height as in shot manufacture. These balls are then mixed with the powdered aluminous material such as bauxite in a rotating drum such as shown at 11 in Fig. 2, the bauxite forming a uniform layer 12 (Fig. 3) about the ball 10.

The crystalline grains employed in this process are of the well known carbosilicates or aluminum compounds commonly used in the manufacture of abrasives and described in my co-pending application Serial No. 231,592, filed September 24, 1938. Crystalline grains have been found desirable for abrading processes because of their hardness and also because of their crystalline structure which permits the material to cleave along the crystal planes and constantly present new cutting edges in use. An important disadvantage of the use of crystalline grains alone with the usual weak bond is that before the grain is completely utilized it is forced out of its weak base, thus resulting in a more or less rapid disintegration of the material.

Figure 4:
Fig. 4 is a view of a crystalline grain coated with a volatile substance.
Figure 5:
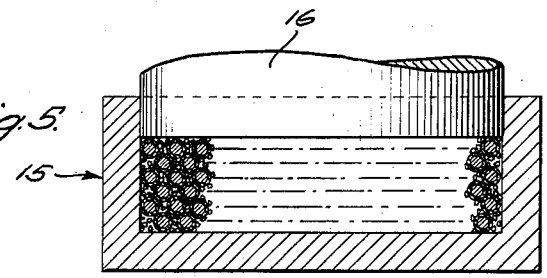
Fig. 5 is a sectional elevation through a press, the chamber of which contains a mixture of the coated balls and crystalline grains of Figs. 3 and 4.
Figure 6:
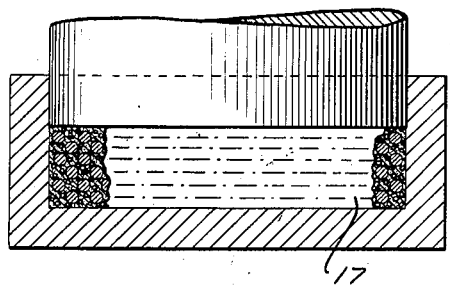
Fig. 6 is another view of the press with the plunger closed.
Figure 7:
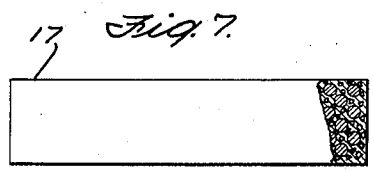
Fig. 7 is a view of the intermediate article removed from the press of Fig. 6.

In accordance with the method described in my copending application Serial No. 231,592, above referred to, crystalline grains of the type mentioned are coated with an oil film such as castor oil and then coated with naphthalene powdered to air-flow dimensions to form a coating 13 (Fig. 4). These two materials—the naphthalene ball coated with abrasive powder and the crystalline grain coated with powdered naphthalene—are then mixed together as by the mixer 11 of Fig. 2 and placed in a press 15 as shown in Fig. 5, the plunger 16 of which is adapted to be moved downwardly, causing a minor distribution of the coating substances so as to close up all of the spaces intermediate the contiguous balls and grains, and producing a compressed intermediate article 17 such as shown in Figs. 6 and 7.

Figure 8:
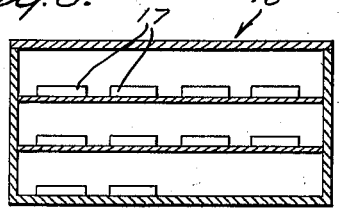
Fig. 8 is a diagrammatic sectional elevation of an oven.

This article is now placed in the oven 18 (Fig. 8) where it is subjected to a low temperature for a time period sufficient to remove the naphthalene. The time of treatment will depend on the size of the articles and the efficiency of the apparatus, varying from several hours to two or three days. The temperature should preferably never exceed a point several degrees below the melting point of the volatile substance since, if liquefied, the substance seals the pore or cell walls, making it impossible for the vapor to escape without destroying the wall structure. In the case of naphthalene this temperature point is 75° C., or five degrees below the melting point.

Figure 9:
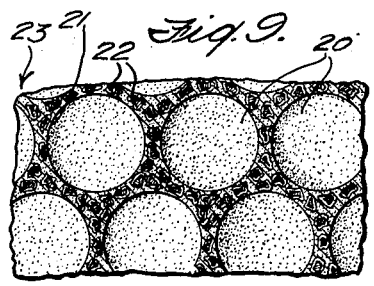
Fig. 9 is a view of the porous intermediate material after the oven treatment.

After the oven treatment in which the naphthalene is sublimated the intermediate article is highly porous or cellular, in accordance with the enlarged section of Fig. 9. Particular attention is directed to the general uniformity of the size of the pores 20, and also the uniformity of thickness of the walls 21. This follows from the fact that initially the naphthalene balls were uniformly coated and that in the mixing and pressure operations the crystalline grains were distributed in the interball spaces without materially affecting the uniformity of the size and spacing of the balls. It is further pointed out that as a result of the oven treatment the naphthalene coatings about the crystalline grains 22 are removed, leaving an oversized pore or cavity for each of the grains 22.

Figure 10:
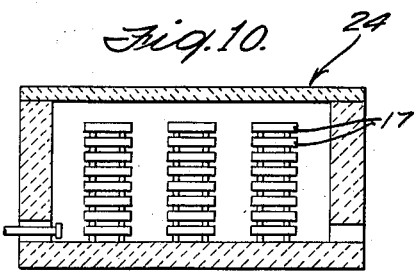
Fig. 10 is a diagrammatic sectional elevation of the vitrifying furnace.

The intermediate article 23 of Fig. 9 is now placed in the furnace 24 (Fig. 10) where it is subjected to a temperature sufficiently high to bring about vitrification of the aluminous material. This temperature will vary with the nature of the aluminous substance, in the case of bauxite, for example, ranging from 1200° C. to 1450° C., and in the case of alumina from 1200° C. to 1600° C. In any event, irrespective of the material used, the firing temperature is kept below the melting point of the substance, in accordance with the process as described in my co-pending application Serial No. 131,126, filed March 16, 1937, hereinabove identified.

The time of firing also varies with the materials employed, the size of the article, and the efficiency and size of the furnace, and may vary from nine hours in the case of small articles and bauxite, to one or two weeks for larger articles.

As a result of the firing operation the aluminous material shrinks considerably, in the case of bauxite there being a shrinkage of approximately 30%, and in the case of alumina a shrinkage of around 23%. Because of the enlarged spaces in which the crystalline grains are placed, the aluminous material may freely shrink over these grains which have zero shrinkage, thus binding them securely and rigidly in the mass of vitreous material. Unless provision were made to allow for the disparity between the shrinkage of the crystalline grain and the aluminous material the final product would be worthless, being soft and lacking in abrasive properties. The shrinkage further results in a lessening of the diameter of the pores or cells, as will be apparent from inspection of the finally vitrified article 25 (Fig. 11) and the intermediate article 23 of Fig. 9, the pores 26 of the article 25 having a lesser diameter.

Figure 11:
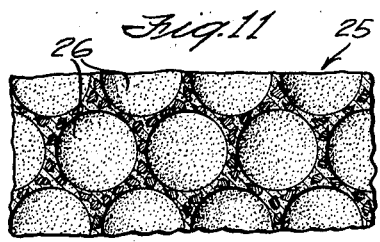
Fig. 11 is an enlarged section of a portion of the furnace-heated material.

The article as shown in Fig. 11 may be usable as an abrasive without further treatment, provided the press of Fig. 5 has the requisite shape for the article desired. For example, abrasive wheels of all sizes may be constructed from mold-presses, the material of which, in cross section, will be in accordance with that shown in Fig. 11. This finished product fulfills the purposes of the invention in that the article is capable of a varying porosity or ceullular volume not only in the neighborhood of 85%, but of lesser porosity or cellular volume and greater rigidity due to the employment of the abrasive crystalline grains in the cellular wall. As suggested hereinabove, if the grains were absent from the wall structure a wall thickness in excess of 85% porosity or cellular volume would tend to produce glazing on account of the nature of the vitreous aluminous material. With the inter-mixing of the crystalline grains, however, the effect is to break up the homogeneous wall surface with a material which breaks along its crystalline planes, consequently forming new cutting surfaces as the material wears down, and at the same time limiting the effective width of the adjacent vitreous substance to a size at which it tends to break down in the grinding operation without glazing. Thus an abrasive surface is produced which includes a multitude of hard cutting wall edges separated by crystalline grains, both grains and walls wearing down in use. These cutting edges between the grains, to avoid glazing, are preferably between 0.001 and 0.010 inch in thickness, but these limits may be varied in accordance with the size of the crystals and the type of abrasion for which the article is intended.

Figure 12:
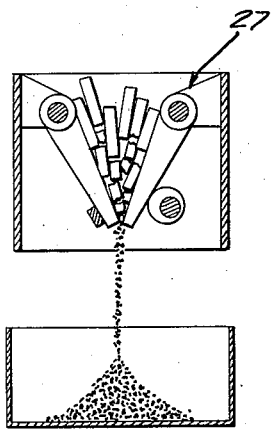
Fig. 12 shows a rough crusher for breaking the abrasive bricks or cakes.

The material of Fig. 11 may also be employed in the usual manner as spaced composite grains bonded by a relatively weak bond such as rubber or synthetic resin. To form an abrasive of this type the process is continued in accordance with the crushing operations shown in Figs. 12 and 13, the apparatus 27 of Fig. 12 rough grinding the pressed article 25 in the shape of cakes or bricks, and the crusher 28 fine grinding the material. Grading operations are then carried on, as for example by means of the sieves 29 of Fig. 14. The composite grains resulting from the grinding operation are then bonded in any desired way to form an abrading article. For example, the grains may be bonded with rubber, shellac, fluxing clays, silicate of soda or synthetic resin in the shape of a wheel for wheel grinding, or the material may be bonded to a flat surface for flat abrasion.

A section 30 of a detail of such an article is shown in Fig. 15, in which the various grains 31 are shown together with the bond 32. An important feature of the abrasive article of the type shown in Fig. 15 is that whereas in the case of crystalline grains and a bond alone the bonding action is often weak due to the small size and smooth and irregular surface of the grains, in the structure of Fig. 15 the composite grains have a highly irregular contour and a size and surface area greatly enlarged over that of a crystalline grain and hence the bonding action is tenacious, resulting in higher resistance to the removal of the composite grain in the abrading action prior to a more or less complete wearing down of the same in use.

While I have shown my invention primarily as applied to abrasive articles, nevertheless the principle of combining a non-shrinkable grain with a highly shrinkable and porous or cellular bonding material is susceptible of application and adaptation to other uses, and consequently I do not desire to limit myself to the precise exemplary embodiment shown and described except insofar as is required by the claims hereto appended.

In my co-pending application Serial No. 231,592, filed September 24, 1938, I have particularly described the production of a ceramic in which hard crystalline abrasive grains form a disperse phase, while a hard, amorphous, vitrified bauxite or alumina forms a continuous phase binding said grains together.

In my co-pending application Serial No. 225,376, filed August 17, 1938, I have disclosed the preparation of aluminous ceramics formed of a vitrified, amorphous, colloidally ground aluminous material, which abrasive material has a cellular or porous construction, which pores have been formed by incorporating a volatilizable material, followed by driving off the volatilizable material and firing the material to vitrify it.

I claim as my invention:

1. A process of making an abrasive article which comprises coating the bodies of a mass of spheroidal bodies of volatile substance with a finely divided, colloidally ground, readily vitrifiable aluminous material, coating a non-volatile, crystalline, abrasive grain with a layer of said volatile material, mixing the coated volatile substance and the coated non-volatile substance together, compressing the mixed particle to form an article, subjecting said compressed article to low temperature heat to remove the volatile substance from the mass, and firing the article at a temperature below the melting point of the finely divided substance, said aluminous material being selected from the group consisting of wet ground dehydrated amorphous alumina and bauxite and said abrasive article having a cellular structure in which the cells occupy a major part of the volume of the article.

2. A process for producing an abrasive material which consists in coating the bodies of a mass of spheroidal bodies of volatile substance with a finely divided, colloidally ground, readily vitrifiable aluminous material, coating a crystalline abrasive grain with a volatile substance, mixing the coated volatile mass and crystalline grain, subjecting this mixed mass to pressure to eliminate inter-particle spaces and form a preliminary article, subjecting the preliminary article to heat at a temperature below the melting point of the volatile substance to bring about sublimation of said substance, and firing the article at a temperature below the melting point of the finely divided substance, said aluminous material being selected from the group consisting of wet ground dehydrated amorphous alumina and bauxite and said abrasive article having a cellular structure in which the cells occupy a major part of the volume of the article.

3. A process of making an abrasive article which consists in coating balls of naphthalene with powdered, colloidally ground, readily vitrifiable aluminous material, the particles of which having a size of 20 microns or less, coating crystalline abrasive grains with powdered naphthalene, mixing the coated grains and coated naphthalene balls to bring about uniform distribution of the two elements, subjecting the mixture to pressure in a mold to produce an article from which inter-particle spaces have been eliminated, heating the article at a temperature of approximately 75° C. to sublimate the naphthalene, and heating the article at a temperature below the melting point of the aluminous material, said aluminous material being selected from the group consisting of wet ground dehydrated amorphous alumina and bauxite and said abrasive article having a cellular structure in which the cells occupy a major part of the volume of the article.

4. A process for making abrasive substances which comprises coating volatile bodies with a layer of colloidally ground, readily vitrifiable aluminous material, coating crystalline abrasive grains with a layer of said volatile bodies, mixing the coated grains and coated volatile bodies together, compressing the mixture to form a cake, heating the cake at a temperature below the melting point of the volatile substance to cause sublimation thereof, heating the cake at a temperature below the melting point of the aluminous material to bring about vitrification and shrinkage of the same, crushing the cake so formed into composite grains consisting of fragmentary masses of vitrified aluminous material having large pore openings and small pore openings, the grains being retained by said small pore openings, and uniting said composite particles by a bond having a hardness less than that of the composite article, said aluminous material being selected from the group consisting of wet ground dehydrated amorphous alumina and bauxite and said abrasive substances having a cellular structure in which the cells occupy a major part of the volume of the article.

5. A process of forming a cellular abrasive material having a hard, abrasive, amorphous, vitrified aluminous material forming a continuous phase and grains of a hard, abrasive material forming a disperse phase embodied in and bonded by the vitrified aluminous material, both the continuous and disperse phase serving as abrasive materials, said process comprising dehydrating and thereafter finely grinding an aluminous material in water to substantially colloidal size, drying and powdering said ground aluminous material, coating particles of naphthalene with said finely divided aluminous material, coating hard abrasive grains with a volatilizable oily adhesive material and then with finely divided naphthalene, compressing these materials together, baking to remove the naphthalene at below 80° C., and firing at a temperature of between 1200° and 1600° C., said aluminous material being selected from the group consisting of wet ground dehydrated amorphous bauxite and alumina having a particle size of less than 20 microns.

6. A process of forming a cellular, aluminous, abrasive material, which comprises coating fused crystalline alumina grains with castor oil and then with a finely divided naphthalene coating, coating naphthalene particles with a finely divided, colloidally ground, amorphous, dry aluminous material, mixing the coated materials together, compressing them to form an article, baking to remove the naphthalene at a temperature below 80° C., and then firing at a temperature of 1200° to 1600° C.

7. A cellular, dehydrated, amorphous, vitrified, non-crystalline bauxite abrasive having a shrinkage of about 30%, said bauxite abrasive carrying and bonding together grains of crystalline fused alumina, the cellular structure constituting about 85% of the total volume of the abrasive, the spacing between the grains varying between 0.001 and 0.010 inch.

8. A cellular, amorphous, vitrified, non-crystalline, fired alumina abrasive having a shrinkage of about 23%, bonding together and carrying as a disperse phase abrasive grains of silicon carbide, the cellular structure constituting about 85% of the total volume of the abrasive, the spacing between the grains varying between 0.001 and 0.010 inch.

9. A cellular, dehydrated, amorphous, vitrified, non-crystalline aluminous ceramic carrying and bonding together the grains of a crystalline abrasive, the cells and crystalline grains in said abrasive constituting a disperse phase while the vitrified aluminous material constitutes the continuous phase.

JOHN ALLEN HEANY.